United States Patent
Lapuh et al.

(10) Patent No.: US 7,463,579 B2
(45) Date of Patent: Dec. 9, 2008

(54) ROUTED SPLIT MULTILINK TRUNKING

(75) Inventors: Roger Lapuh, Uesslingen (CH); Tamiji Homma, Mountain View, CA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 842 days.

(21) Appl. No.: 10/618,136

(22) Filed: Jul. 11, 2003

(65) Prior Publication Data
US 2005/0007951 A1 Jan. 13, 2005

(51) Int. Cl.
*G01R 31/08* (2006.01)
*G06F 3/00* (2006.01)
*H04L 12/28* (2006.01)

(52) U.S. Cl. .................... 370/216; 370/400; 710/38
(58) Field of Classification Search ......... 370/216–228, 370/254, 400–401; 709/239
See application file for complete search history.

(56) References Cited

U.S. PATENT DOCUMENTS

| | | | |
|---|---|---|---|
| 5,742,604 A * | 4/1998 | Edsall et al. .................. 370/401 |
| 6,202,170 B1 * | 3/2001 | Busschbach et al. .......... 714/11 |
| 6,496,502 B1 * | 12/2002 | Fite et al. ..................... 370/389 |
| 6,657,951 B1 * | 12/2003 | Carroll et al. ................ 370/222 |
| 6,910,149 B2 * | 6/2005 | Perloff et al. .................. 714/4 |
| 7,061,858 B1 * | 6/2006 | Di Benedetto et al. ....... 370/219 |
| 7,197,660 B1 * | 3/2007 | Liu et al. ........................ 714/4 |
| 7,254,109 B2 * | 8/2007 | Verma et al. ................. 370/217 |
| 7,272,674 B1 * | 9/2007 | Nandi et al. ................... 710/38 |
| 2002/0124107 A1 * | 9/2002 | Goodwin ..................... 709/242 |
| 2003/0016624 A1 * | 1/2003 | Bare ............................ 370/217 |
| 2003/0048746 A1 * | 3/2003 | Guess et al. ................. 370/219 |
| 2003/0084367 A1 | 5/2003 | Suemura |
| 2003/0097470 A1 * | 5/2003 | Lapuh et al. ................. 709/239 |
| 2003/0152026 A1 * | 8/2003 | Lohr ........................... 370/221 |
| 2003/0185181 A1 * | 10/2003 | Balachandran et al. ....... 370/337 |
| 2006/0062414 A1 * | 3/2006 | Oran ........................... 370/216 |
| 2007/0198670 A1 * | 8/2007 | Andreev et al. .............. 709/220 |

OTHER PUBLICATIONS

Unknown Author (Nortel Networks-2004). Eliminate Single Point of Failure-13 White Paper—Split Multi-Link Trunking/Routed Split Multi-Link Trunking. Retrieved Feb. 27, 2007 from www.nortel.com/products/01/passport/8600_rss/collateral/nn108460-060304.pdf.*

R. Lapuh, et al.; Split Multi-link Trunking (SMLT), Online!, Jun. 2003, Internet Draft: Draft-Lapuh-Network-SMLT-02.TXT, XP002298970, Retrieved from the internet: URL:mirrors.isc.org/pub/www.watersprings.org/pub/fd/draft-lapuh-network-smit-02.txt>retrived on Oct. 10, 2004.

Extreme Standby Router Protocol and Virual Routing Redundancey Protocol, Extreme Networks. White Papers, Jul. 31, 2002, XP 002243350.

* cited by examiner

*Primary Examiner*—Seema S. Rao
*Assistant Examiner*—Xavier SzeWai Wong
(74) *Attorney, Agent, or Firm*—Blakely, Sokoloff, Taylor & Zafman LLP

(57) ABSTRACT

In one embodiment, the invention relates to a method in which at least two aggregation devices, which logically operate as a single device, are interconnected by an Inter Switch Trunk (IST) link. Thereafter, forwarding records of local routing instances between the at least two aggregation devices are synchronized to enable one aggregation device to support data traffic for the other aggregation device if it has failed or a link to the aggregation device has failed.

17 Claims, 8 Drawing Sheets

US 7,463,579 B2

ROUTED SPLIT MULTILINK TRUNKING

FIELD

Embodiments of the invention relate to the field of networking communications, in particular, to a system and method for improving communication network reliability through a routed split multilink trunk configuration.

GENERAL BACKGROUND

Over the last decade, communication networks are commonly used for transporting data. As networks grow ever more critical, there has been recent improvements to Layer 2 (L2) network reliability. Such improvements have been accomplished using Split Multilink Trunking (SMLT), which avoids the downfalls of Spanning Tree Protocol. SMLT provides multiple paths from all edge devices in a network into the core of the network in order to eliminate all single points of failure and minimize the amount of time required to re-route around device failures. SMLT is described in a co-pending U.S. patent application entitled "System, Device, and Method for Improving Communication Network Reliability," (application Ser. No. 10/125,654 filed Apr. 18, 2002) which is incorporated by reference herein.

While SMLT avoids the disadvantages associated with Spanning Tree Protocol and improves L2 network reliability, it does not address failover and recovery associated with Layer 3 (L3) networks. Of course, it is appreciated that SMLT may be used in connection with Virtual Router Redundancy Protocol (VRRP), namely the VRRP BackupMaster feature, to achieve quicker L3 failover and recovery. However, this particular failover and recovery process is protocol dependent.

BRIEF DESCRIPTION OF THE DRAWINGS

The invention may best be understood by referring to the following description and accompanying drawings that are used to illustrate embodiments of the invention.

FIG. 7 is a first exemplary embodiment of a network configured in accordance with one embodiment of the invention.

DETAILED DESCRIPTION

Figure 1:
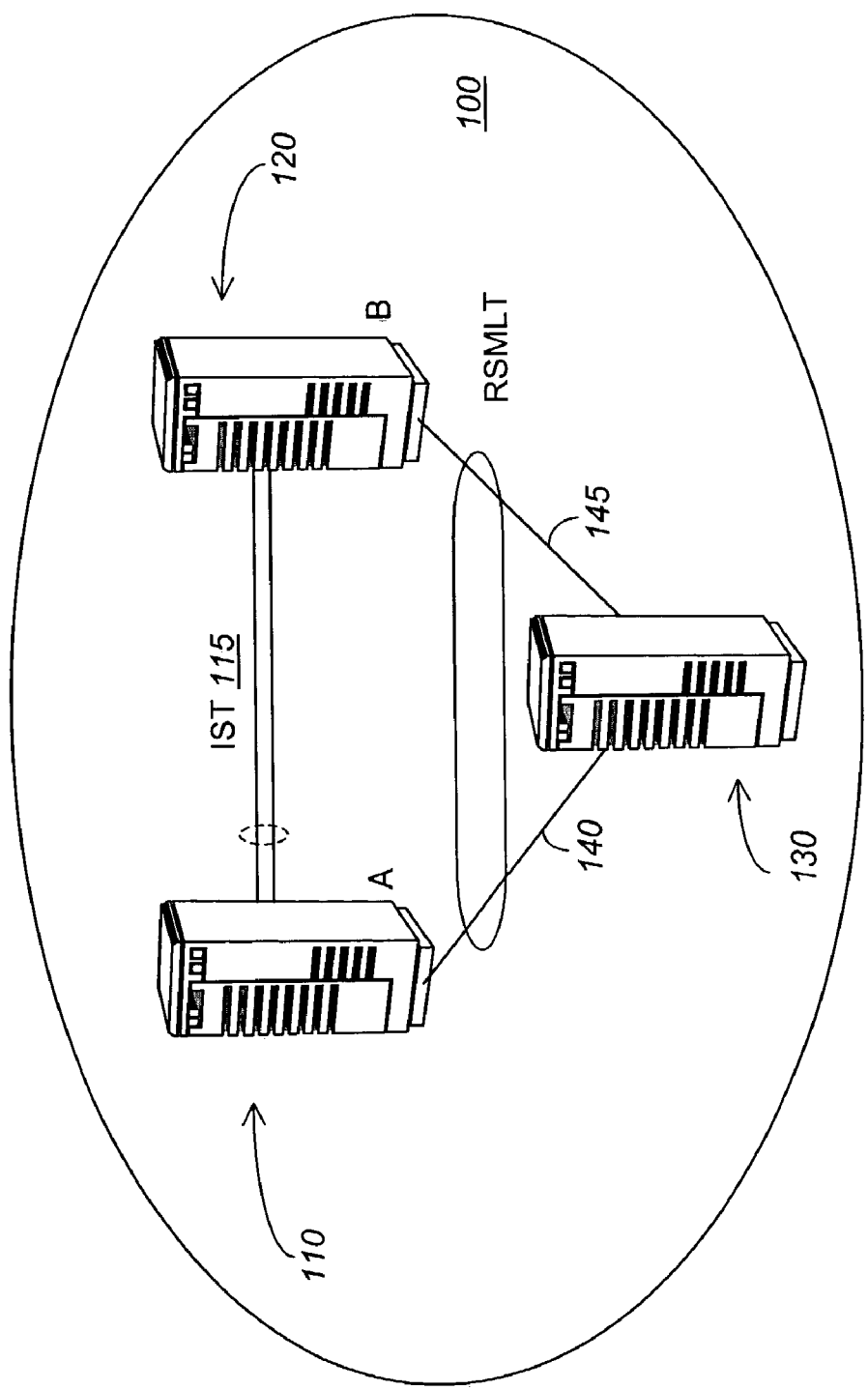
FIG. 1 is a first exemplary embodiment of a network topology deploying a plurality of aggregation devices in accordance with routed split multilink trunking (RSMLT).

Herein, certain embodiments of the invention relate to a system, communication device and method for improving network reliability based on routed split multilink trunking (hereinafter referred to as "RSMLT"). According to one embodiment of the invention, RSMLT provides sub-second failover for "Layer Three" (L3) networks using such L3 networking protocols as IP-RIP, IP-OSPF, IP-BGP or IPX-RIP or the like. Sub-second failover is achieved by synchronizing forwarding records (e.g., media access control "MAC" records) of the local routing instances for a L3 networking protocol between "peer" aggregation devices. This synchronization reduces the amount of time required for network recovery, yet provides the L3 protocol enough time to converge without affecting the data forwarding operations performed by the aggregation devices.

RSMLT is routing protocol independent, because it is only a manipulation of the data path. The data path is mostly manipulated by changing the forwarding records of specified routing instances. In order to provide and maintain sub-second failover without reliance on any particular routing protocol, changes have been made in Address Resolution Protocol (ARP) communications between neighboring aggregation devices. Moreover, additional IST messages are exchanged between peer aggregation devices and timers are deployed in order to control the updating of entries within the stored forwarding records.

Certain details are set forth below in order to provide a thorough understanding of various embodiments of the invention, albeit the invention may be practiced through many embodiments other than those illustrated. Well-known logic and operations are not set forth in detail in order to avoid unnecessarily obscuring this description.

In the following description, certain terminology is used to describe features of the invention. For example, a "communication device" is an apparatus that propagates information from a source to a destination. Examples of different types of communication devices include, but are hot limited or restricted to the following: a bridge, a router, a switch, or the like.

An "aggregation device" is a communication device that connects to two or more other communication devices. For example, in one embodiment of the invention, the aggregation device may be a switch that connects to multiple wiring closet switches, typically within a single building. Multiple aggregation devices in communication with each other over an Inter Switch Trunk (IST) communication link (described below) are referred to as an "IST peer device" for the other or a "neighboring aggregation device".

The term "message" is used herein to describe one or more packets that may be created, transmitted, received, stored, or processed by a communication device. Examples of different packet types include, but are not limited or restricted to any one of the following: a frame, a datagram, a user datagram, a cell or any portions thereof.

A "link" or "interconnect" is generally defined as a communication pathway between two or more communication devices. This pathway may be established through information-carrying medium such as, for example, electrical wire(s), optical fiber(s), cable(s), bus trace(s), wireless signaling equipment, or the like. The term "failover" is generally referred to as a condition, in case of a failure such as link or device failure, the peer switch will take over the packet forwarding for the failed device.

The term "Inter Switch Trunk" (or IST) comprises one or more parallel point-to-point links that couple two or more aggregation devices together. The aggregation devices utilize this channel to share information so that they may operate as a single logical device. Each of these aggregation devices is referred to as an "IST peer" device for the other.

The term "MultiLink Trunk" or (MLT) is a method of link aggregation that allows multiple point-to-point links to be aggregated together in order to provide a single logical trunk. An MLT provides the combined bandwidth of the multiple links, as well as the physical layer protection against failure of any single link. "Split MultiLink Trunk" or (SMLT) is MLT with one end of which is split between at least two aggregation devices. The Institute of Electrical and Electronics Engineers. (IEEE) has defined the MLT function in the current IEEE 802.3ad specification.

Embodiments of the invention may be embodied in many different forms of logic, including but not limited or restricted to software, firmware or hardware. In one embodiment, the logic may be programmable for use with a programmable logic device (e.g., a Field Programmable Gate Array "FPGA" or other programmable logic device "PLD"). In other embodiments, the logic within a communication device may be deployed as (i) discrete components, (ii) integrated circuitry (e.g., a processor, an Application Specific Integrated Circuit "ASIC"), or (iii) software stored in a readable medium and executed by a processor (e.g., a microprocessor, microcontroller, digital signal processor, state machine, etc.).

Software implementing all or part of the functionality described herein may be embodied in various forms such as, for example, source code, executable, a set of instructions that is converted into executable form, and an intermediary form (e.g., form generated by an assembler, compiler, linker, or locator). Source code may include a series of computer program instructions implemented in any of a number of programming languages (e.g., an object code, an assembly language, or a high-level language such as Fortran, C, C++, JAVA, or HTML).

The software may be fixed, either permanently or transitorily, in a tangible storage medium such as a semiconductor memory device (e.g., RAM, ROM, PROM, EEPROM, or Flash-Programmable RAM), a magnetic memory device (e.g., a diskette or hard disk), an optical memory device (e.g., CD-ROM, DVD), a PC card (e.g., PCMCIA card), or other memory device. The software may also be fixed in an uploaded signal using any of various communication technologies, including, but in no way limited to, analog technologies, digital technologies, optical technologies, wireless technologies, networking technologies, and internetworking technologies. The software may be distributed in any form as a removable storage medium with accompanying printed or electronic documentation (e.g., shrink wrapped software), preloaded on non-volatile memory of a computer system (e.g., ROM, hard disk, flash, etc.), or distributed from a server or electronic bulletin board over the communication system (e.g., Internet or World Wide Web).

I. RSMLT Topologies

Figure 3:
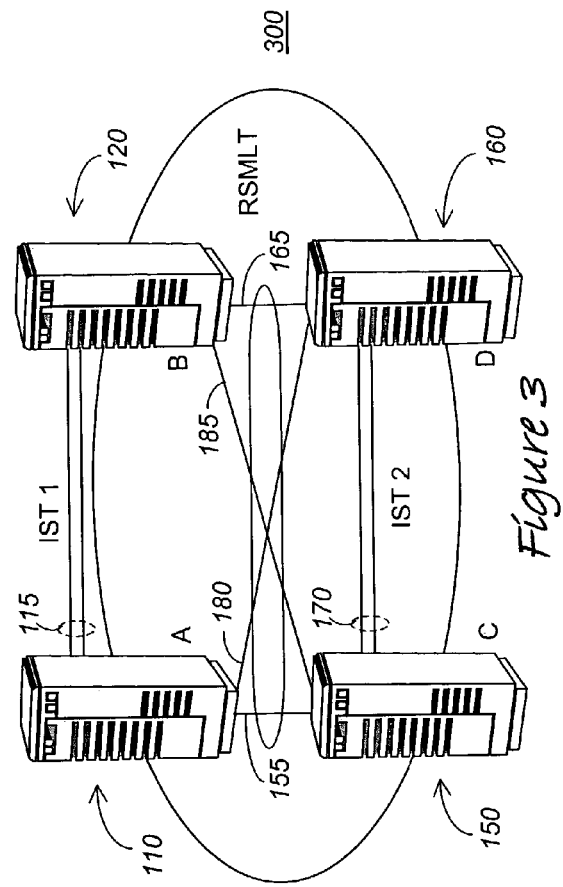
FIG. 3 is a third exemplary embodiment of a network topology deploying a plurality of aggregation devices in accordance with RSMLT.
Figure 2:
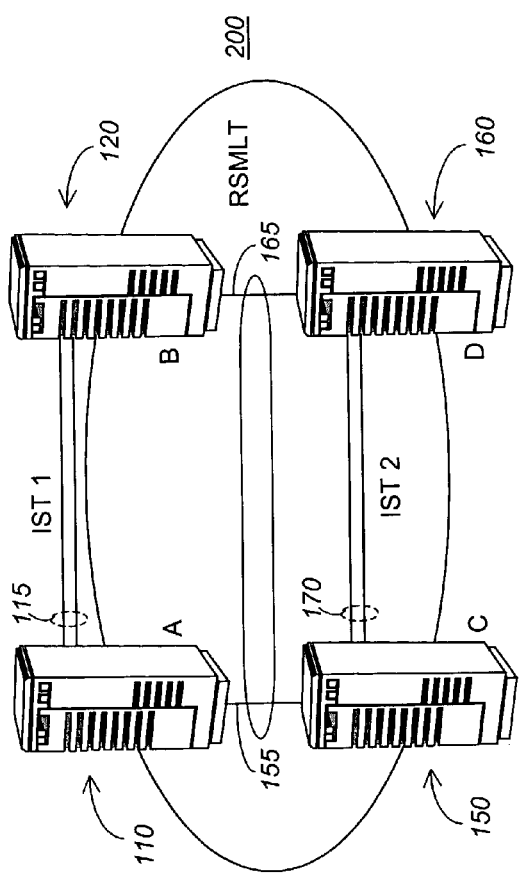
FIG. 2 is a second exemplary embodiment of a network topology deploying a plurality of aggregation devices in accordance with RSMLT.

Referring now to FIGS. 1-3, exemplary embodiments of different RSMLT topologies are shown. These exemplary embodiments include a triangle topology 100, a square topology 200 and a mesh topology 300. Each of these trunk splitting topologies provides redundant paths and redundant aggregation devices to provide rapid fault detection and forwarding path modification.

With respect to FIG. 1, RSMLT triangle topology 100 features a first aggregation device 110 in communication with a, second aggregation device 120 over an IST communication link 115. Thus, first aggregation device (A) 110 is considered to be an IST peer device for second aggregation device (B) 120 and second aggregation device (B) 120 is considered to be an IST peer device for first aggregation device (A) 110. First and second aggregation devices 110 and 120 are also in communication with a communication device 130 over links 140 and 145, respectively.

As shown in this embodiment, aggregation devices 110 and 120 collectively operate as a single logical communication device by sharing their forwarding records, such as MAC records for example, in the event that either (1) one of the aggregation devices 110 or 120 goes "down" or (2) a link to one of these devices goes "down". Herein, an aggregation device is determined to be "down" if it is non-operational or is operating improperly. A link is determined to be "down" if any one of its physical link(s) forming the link has failed.

As a result, if second aggregation device 120 is down, the IST peer device of second aggregation device 120, namely first aggregation device 110, would be configured to route one or more packets of data normally routed by second aggregation device 120.

With respect to FIG. 2, a second exemplary embodiment of RSMLT square topology 200 is illustrated. This topology 200 comprises first aggregation device (A) 110 and second aggregation device (B) 120 in communication over first IST communication link 115. Moreover, first aggregation device (A) 110 is coupled to a third aggregation device (C) 150 via a link 155 while second aggregation device (B) 120 is coupled to a fourth aggregation device (D) 160 via a link 165. Links 155 and 165 provide bi-directional communications between devices A-C and devices B-D. Third and fourth aggregation devices 150 and 160 are coupled to each other over a second IST communication link 170.

As shown herein, aggregation devices 110 and 120 collectively operate as a single logical communication device by sharing their MAC records in the event that one of these device 110 or 120 goes down. Likewise, devices 150 and 160 collectively operate as a single logical communication device by sharing their MAC records as well. Thus, if second aggregation device 120 or link 165 goes down, for example, the IST peer device of second aggregation device 120, namely first aggregation device 110, would route one or more packets of data previously routed by second aggregation device 120. Such routing would occur via link 155, third aggregation device 150 and IST communication link 170.

Referring now to FIG. 3, a third exemplary embodiment of RSMLT mesh topology 300 is illustrated. Herein, first and second aggregation devices 110 and 120 are interconnected over first IST communication link 115. First aggregation device 110 is coupled to both third and fourth aggregation devices 150 and 160 via links 155 and 180, respectively. Second aggregation device 120 is coupled to both fourth and third aggregation devices 160 and 150 via links 165 and 185, respectively. Third and fourth aggregation devices 150 and 160 are coupled to each other over second IST communication link 170.

Aggregation devices 110 and 120 collectively operate as a single logical communication device by sharing their MAC records in the event that one of these switches 110 or 120 goes down. Likewise, aggregation devices 150 and 160 collectively operate as a single logical communication device by sharing their MAC records as well. Thus, if second aggregation device 120 or link 165 goes down, for example, the IST peer device of second aggregation device 120, namely first aggregation device 110, would route one or more packets of data previously routed by second aggregation device 120. Such routing would occur via link 180.

II. General Architecture of the Aggregation Devices

Figure 4:
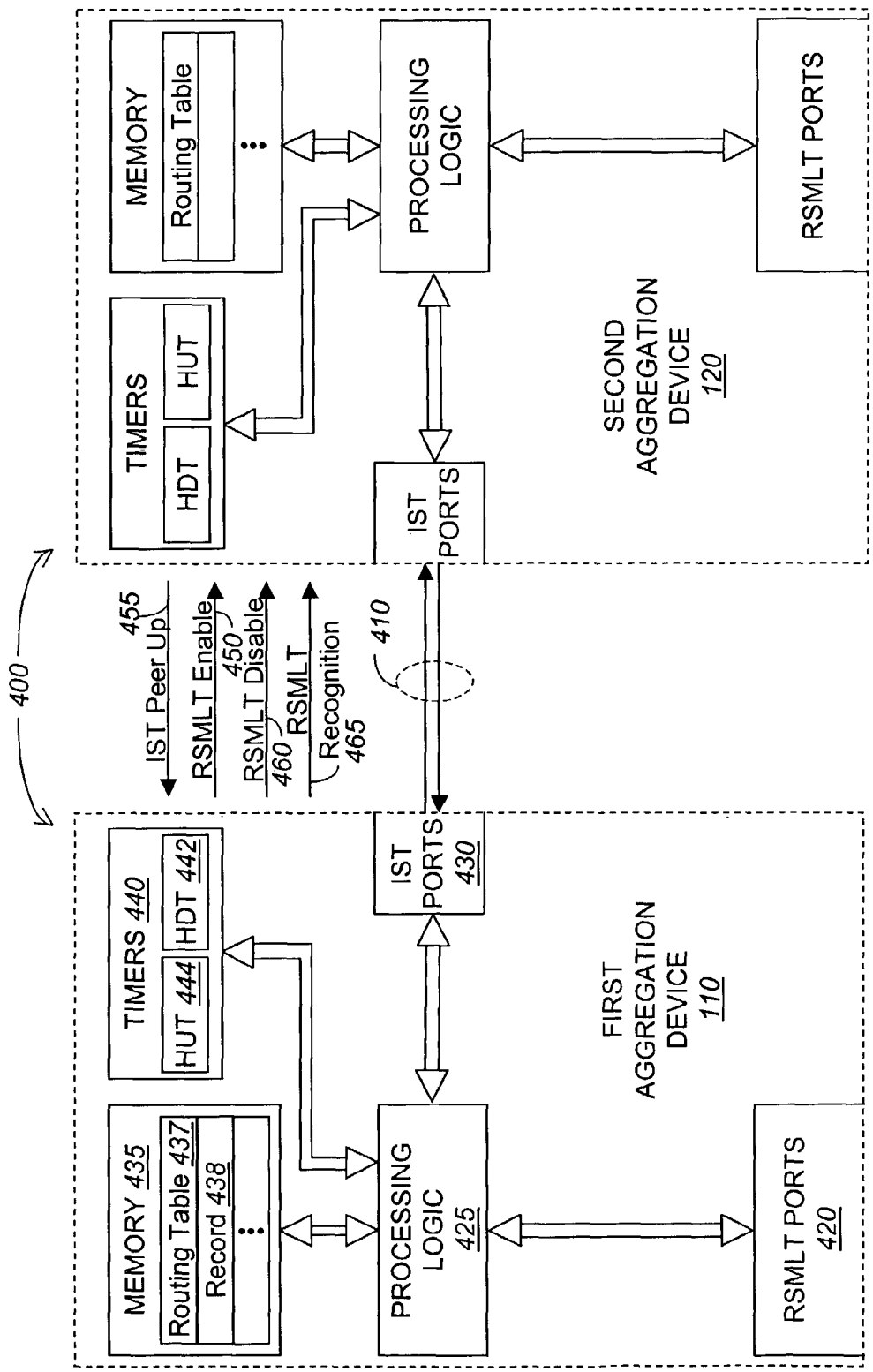
FIG. 4 is an exemplary embodiment of the logic deployed within a plurality of aggregation devices, such as a pair of aggregation devices of FIGS. 1-3, operating in accordance with RSMLT.

Referring now to FIG. 4, an exemplary embodiment of the logic deployed within a plurality of aggregation devices 400, such as aggregation devices 110 and 120 of FIGS. 1-3, is shown. First aggregation device 110 is an IST peer device for second aggregation device 120, and vice versa. Both of these devices 110 and 120 are coupled together via an IST communication link 410 (e.g., link 115 of FIGS. 1-3). Thus, aggregation devices 110 and 120 collectively form one logical communication device.

For illustrative purposes, the architecture of first aggregation device 110 is described in detail. It is contemplated, however, that the same architecture and functionality is supported by second aggregation device 120.

In one embodiment of the invention, first aggregation device 110 comprises RSMLT ports 420, processing logic 425, IST ports 430, a memory 435, and a plurality of timers 440. As shown, RSMLT ports 420 provide an interface adapted to enable multilink trunking with neighboring communication devices.

In one embodiment of the invention, processing logic 425 is responsible for controlling the propagation of data between communication devices. Processing logic 425 may be deployed in a variety of embodiments. For example, in one embodiment of the invention, processing logic 425 may comprise a programmable logic device (e.g., FPGA or PLD). In another embodiment of the invention, processing logic 425 may comprise discrete components. In yet another embodiment of the invention, processing logic 425 may comprise an integrated circuit in the form of an ASIC or a processor (e.g., a microprocessor, micro-controller, digital signal processor, state machine, etc.).

IST ports 430 provide an interface to enable first aggregation device 110 to communicate with its IST peer device over IST communication link 410. Herein, IST communication link 410 is adapted to support a polling mechanism such as a request/acknowledgement signaling scheme for example. This polling mechanism enables at least one, and alternatively all of the plurality of the aggregation devices 400 to detect if any of the plurality of aggregation devices 400 have gone down.

Memory 435 may be implemented externally from processing logic 425 as shown or may be implemented within processing logic 425 itself (e.g., on-chip memory for processor or ASIC). Memory 435 is adapted to store a routing table 437 that includes one or more MAC records 438.

For one embodiment of the invention, each hardware record comprises MAC tables, ARP tables, IP routing tables and IPX routing tables. These tables share the same record space, but are used independently. Each MAC table comprises a plurality of MAC records each having a MAC address and perhaps some indication (e.g., a routing bit) that allows routing of those records over its own RSMLT ports 420.

More specifically, when the routing bit is set to a first logic level (e.g., logic "1"), a routing lookup machine, being a component of processing logic 425 for first aggregation device 110, also now processes an incoming packet having a MAC address normally supported by second aggregation device 120 (e.g., IST peer device). The routing lookup will then be based on the IP routing records for IP or IPX routing records for IPX. When the routing bit is set to a second logic level (e.g., logic "0"), first aggregation device 110 is not allowed to perform such routing.

Between IST peer devices, the MAC records are synchronized, namely exchanged, so local routing instances of each aggregation device 110, 120 has access to the MAC record(s) of its IST peer device 120, 110. More specifically, local routing instances feature a local MAC address associated with it, and thus, as a packet with a destination MAC address of the local routing instance is ingressing, and that destination MAC address corresponds with a MAC address of the peer IST device, it is also processed through the routing lookup machine.

Timers 440 comprise a Hold-down timer (HDT) 442 and a Hold-up timer (HUT) 444. Hold-down timer 442 is used to ensure proper convergence of the routing protocol utilized by RSMLT, hereinafter referred to as the "RSMLT routing protocol," before first aggregation device 110 is permitted to operate as a "back-up" for second aggregation device 120. Examples of these routing protocols include Routing Information Protocol (RIP), Open Shortest Path First (OSPF), BGP, or the like.

More specifically, when the RSMLT routing protocol is enabled, aggregation device 110 needs to wait for convergence. Until then, routing table 437 may not be in a stable state, and thus, first aggregation device 110 cannot operate as a "back up" for second aggregation device 120.

For one embodiment of the invention, although not shown, Hold-down timer 442 is initiated after receipt of an RSMLT Enable message from second aggregation device 120. First aggregation device 110 also sends an RSMLT Enable message to second aggregation device 120 in response to an IST Peer UP message from second aggregation device 120 to indicate to the IST peer device that first aggregation device 110 is RSMLT enabled. Received over IST communication link 410, the IST Peer UP message indicates that the IST peer device, namely second aggregation device 120 for this embodiment, is operational.

After reaching or expiration of a first count value by Hold-down timer 442, first aggregation device 110 is able to operate as a "back up" for its IST peer device, namely second aggregation device 120. It is contemplated that the first count value may be set to a default value which provide a delay of at least sixty (60) seconds; however, any value is be used to provide a longer or shorter delay.

For square and mesh topologies, aggregation device 110 may be configured to continue to operate as a "back up" for its IST peer device(s) after receiving a "SMLT_Neighbor_Down" message over RSMLT port 420 until the Hold-up timer 444 has expired. The SMLT_Neighbor_Down message indicates that a particular aggregation device or link is down. As an illustrative example, referring back to FIGS. 2-3, the SMLT_Neighbor_Down message is transmitted by second aggregation device 120 if link 165 has failed.

Hold-up timer 444 maintains a forwarding state for a period of time and defines how long peer router MAC entries associated with the downed IST peer device or downed link supported by the IST peer device should remain active. After Hold-up timer 444 reaches a second count value or expires, the RSMLT routing protocol would deactivate the ARP entries associated with the IST peer device. This is accomplished by setting routing bit(s) of MAC record(s) associated with the IST peer device back to a second logic level.

As a result, first aggregation device 110 would discontinue operating as a "back up" for its IST peer device. The period of time selected would allow users to locate network problems, reboot the aggregation device, and allow the routing protocol, such as RIP or OSPF, to converge to a normal state after the device or link has recovered.

III. Inter-Operations of the Aggregation Devices

Figure 5:
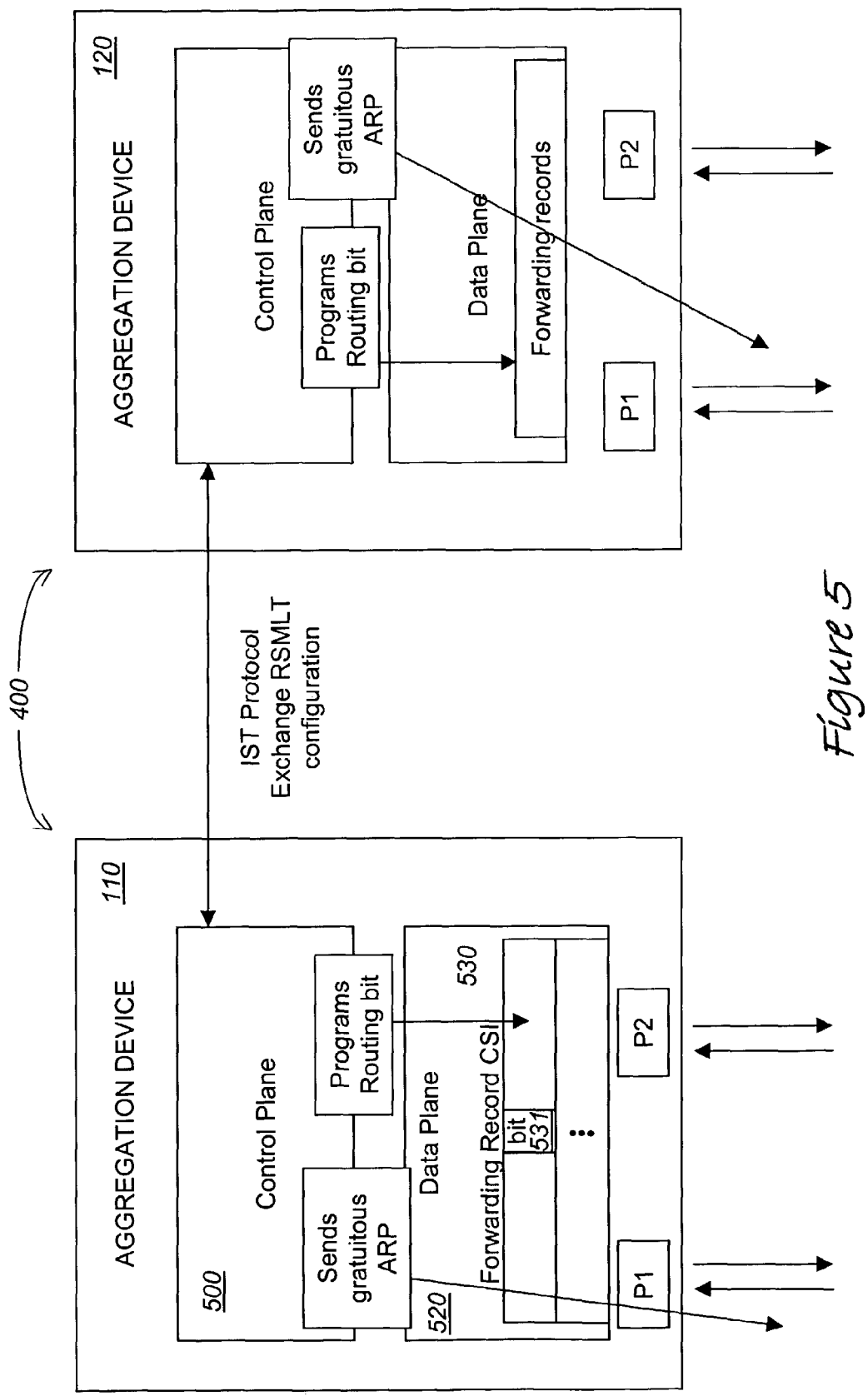
FIG. 5 is a first exemplary embodiment of the inter-operations between the plurality of aggregation devices of FIG. 4 operating in accordance with RSMLT.

Referring now to FIG. 5, an exemplary embodiment of the inter-operations between the plurality of aggregation devices 400 is shown. For clarity, these inter-operations will be discussed in connection with aggregation devices 110 and 120 of FIGS. 1-4.

The data networking functionality of these aggregation devices can be illustrated by two layers, namely a control plane 500 and a data plane 520. Control plane 500 is responsible for controlling various aspects of network signaling, such as link states and device integrity and ensures proper exchange of routing protocol addresses throughout a network. Data plane 520 is responsible for making forwarding decisions based on packet classifications and then forwards the packets to destination ports.

Herein, sub-second failover is achieved by recovery in data plane 520 and providing the control plane protocols enough time to converge without adversely affecting data forwarding operations. This may be achieved by synchronizing the MAC records of the local routing instances for IP and Internetwork Packet Exchange (IPX) between IST peer devices. An IST peer device then applies a bit to enable routing on those records to its own ports. These MAC records are maintained for at least as long as the routing protocols need to converge. By doing so, data plane 520 assures data forwarding even if the IST peer device is down.

As shown, ports "P1" for both aggregation devices 110 and 120 are RSMLT ports. These RSMLT ports share the same IP and MAC addresses.

A. Alteration of the MAC Records

In one embodiment, after the Hold-down timer (implemented in data plane 520) expires, control plane 500 programs at least one bit 531 of one or more MAC records 530 received from the IST peer device to a first logic level (e.g., logic "1"). Bit(s) 531 of the one or more MAC records 530 is(are) returned to a second logic level (e.g., logic "0") after the Hold-up timer has expired.

Each of the MAC records 530 is "Age" based; namely, they are removed in response to an event (e.g., a predetermined time has elapsed; a predetermined number of usages has been exceeded, etc.). Thus, in order to prevent accidental removal of MAC record(s) 530 associated with the "downed" IST peer device or related link, MAC record(s) 530 may be changed to a "Non-Age" status until the Hold-up timer expires.

B. SMLT Communications

Referring back to FIG. 4, in order to inform its IST peer device that it is RSMLT enabled and to begin synchronization of the MAC records, first aggregation device 110 sends out an RSMLT Enable message 450 to second aggregation device 120, namely the IST peer device. RSMLT Enable message 450 is sent after receiving an IST Peer UP message 455 from the IST peer device 120.

When RSMLT feature is disabled on IP or IPX interfaces, normally done manually by the user, first aggregation device 110 informs the IST peer device by transmitting a RSMLT Disable message 460.

In order to recognize the MAC records in second aggregation device 120 of those routing instances in first aggregation device 110, first aggregation device 110 sends out the message of MAC addresses of the routing instances as an RSMLT Recognition message 465 after RSMLT Enable message 450 sent out. RSMLT Recognition message 465 comprises an IP addresses of IP instances participated the RSMLT (or IPX network address of IPX instances), MAC addresses of the IP (or IPX) instances, and VLAN identifiers of the VLAN on which the IP (or IPX) instances participate in RSMLT.

It is contemplated, however, that two or all three of these messages can be combined together as one message when IST Peer UP message received. Moreover, it is contemplated that the same operations may be performed by the IST peer device.

C. IP-ARP Additional Signaling

For a RSMLT square topology of FIG. 2, an ARP entry for second aggregation device 120 ("device B") would be removed from fourth aggregation device 160 ("device D") if device B 120 or link 165 fails. If there is a route with next hop B in device D 160, then the routing table in device D 160 needs to be changed. Also, the MAC record(s) of device B 120 in first aggregation device 110 ("device A") need to be changed. Unfortunately, in the case of a very large network with many ARP records device D 160 takes longer than one sub-second to recover from a network failure if entries are swapped. Thus, through ARP requests, RSMLT enables device D 160 to alter the destination port in one or more of the ARP entries of MAC records associated with device B 120, and achieve sub-second failover.

For example, device A 110 is adapted to broadcast a gratuitous ARP request for all IP routing instances with RSMLT stored in device B 120 that need to be "backed up" by device A 110 if first IST communication link 115 is down. First IST communication link 115 is determined to be "down" if the last physical link of IST communication link 115 has failed. This can occur when device B 120 fails. Those routing instances are now virtually residing in device A 110.

In yet another embodiment of the invention, device B 120 is adapted to broadcast a gratuitous ARP request for all IP routing instances with RSMLT stored in device B 160 if link 165 is down. Link 165 is determined to be "down" if any one of the physical link(s) of link 165 is down.

Also, device D 165 broadcasts a gratuitous ARP request for all IP routing instances with RSMLT in device D 160. When the destination port of the original ARP entry changes to second IST communication link 170, namely the link between device C 150 and device D 160, device D 160 uses another link (e.g., link 180) to reach device B 120 if a full mesh topology is deployed as shown in FIG. 3. If a square topology is deployed, since the data path now is from device D 160, through device C 150 and to device A 110, device A 110 would forward the packets to the destination network directly.

D. IPX Alterations

Figure 7:
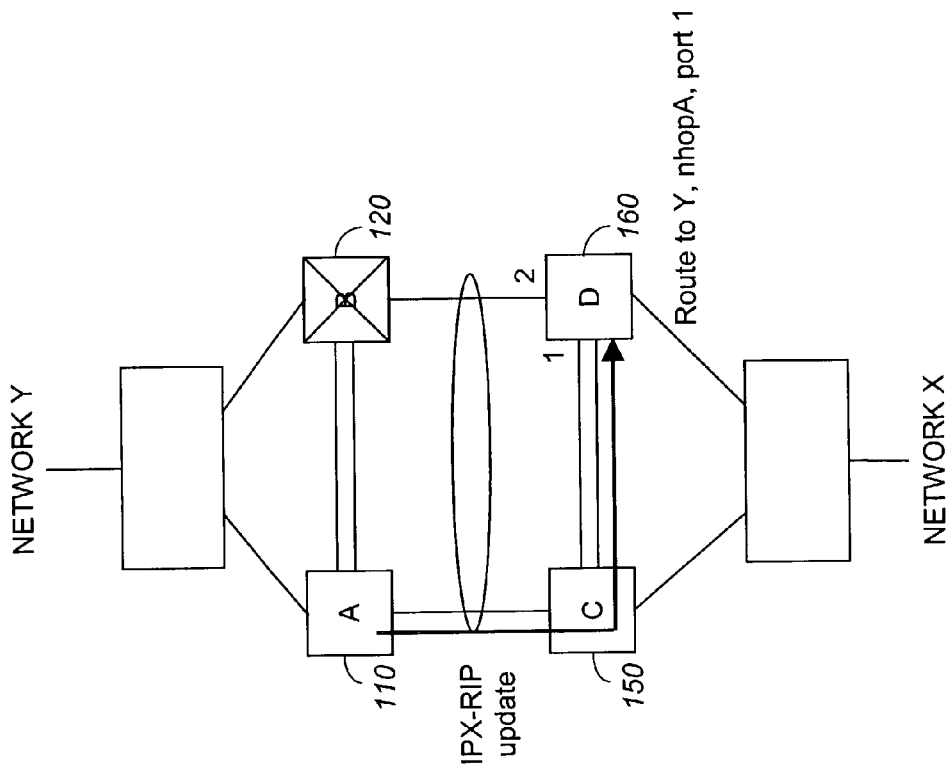
FIGS. 6 and 7 are exemplary embodiment of the RSMLT inter-operations between a plurality of aggregation devices of FIG. 3 deployed in a network under IPX routing protocol.
Figure 6:
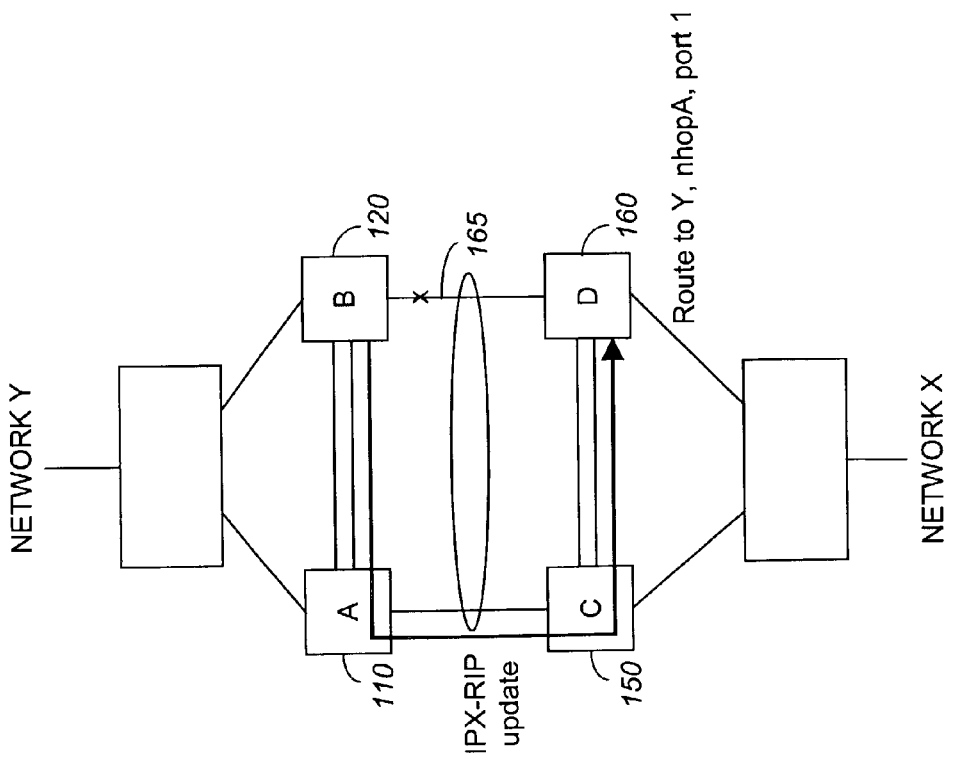

Referring now to FIGS. 6 and 7, in one embodiment of the invention, the IPX-RIP routes are flushed when a link is down. Detection of a downed link for IPX-RIP routes triggers immediate removal of routes learned on that port.

Since IPX does not support an ARP mechanism, an IPX-RIP update is triggered from device B 120. When link 165 is down, as shown in FIG. 6, these packets are designed to change destination MAC addresses of IPX network records stored at device D 160 into MAC addresses of the correspondent VLAN interfaces of device A 110.

When device B 120 is down, however, packets need to be sent out from device A 110 to device D 160 as shown in FIG. 7. These packets also change the destination MAC addresses of IPX network records in device D 160 into MAC addresses of the correspondent VLAN interfaces of device A 110.

Figure 8:
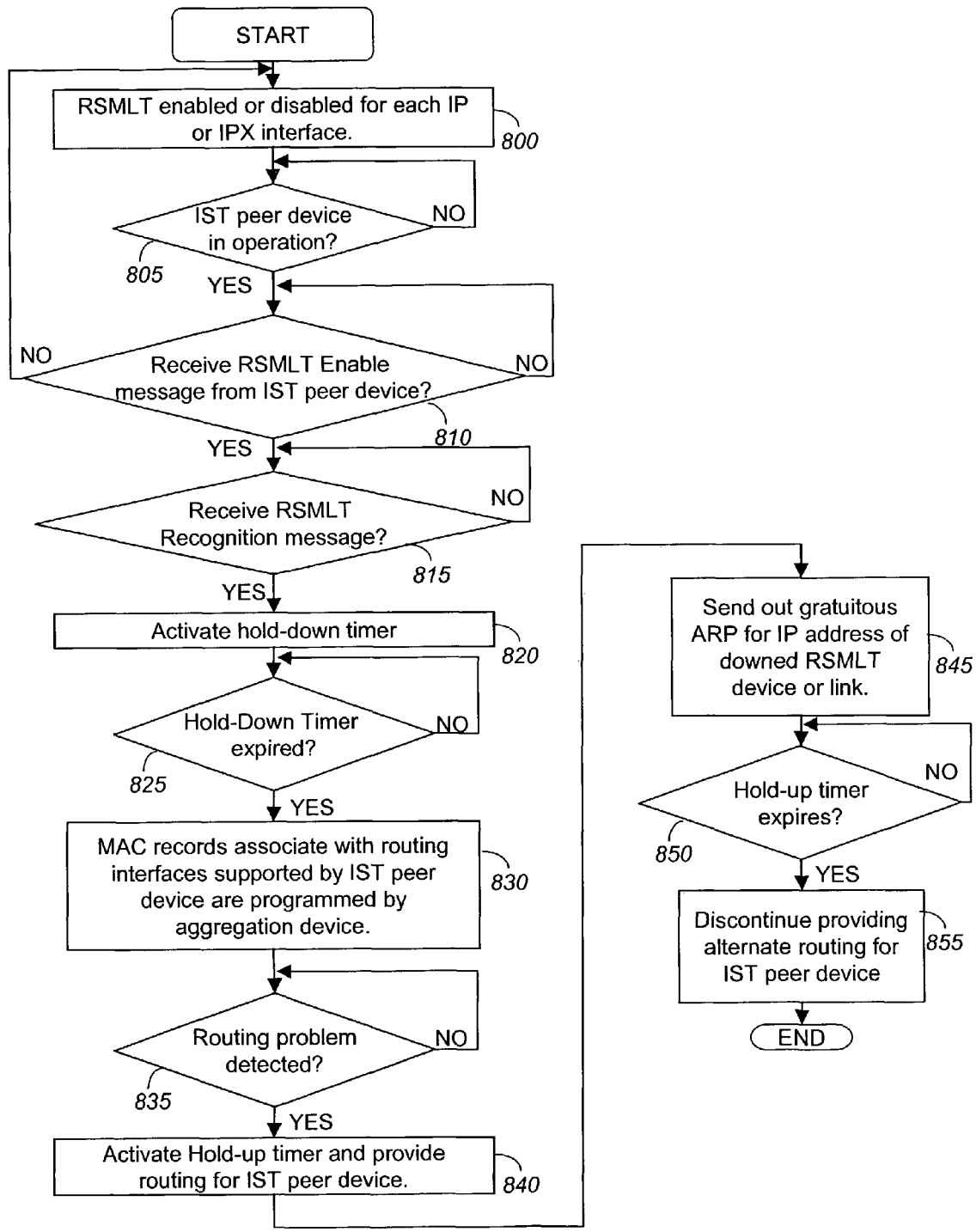
FIG. 8 is an exemplary flowchart of the operations by an aggregation device and its IST peer device forming a RSMLT module.

Referring now to FIG. 8, an exemplary flowchart of the operations of an aggregation device and its IST peer device forming a RSMLT module is shown. First, RSMLT is enabled or disabled for each IP or IPX interface of the aggregation device (block 800). Upon receipt of a message indicating that the IST peer device is in operation, along with RSMLT Enable and RSMLT Recognition messages from IST peer device, the Hold-down timer of the aggregation device is activated (blocks 805, 810, 815, 820). The RSMLT Enable message indicates that RSMLT has been enabled for the IST peer device. The RSMLT Recognition message provides, at a minimum, information used to create MAC records associated with its IST peer device. This information comprises (i) IP addresses of IP instances participating in the RSMLT (or IPX network address of IPX instances), (ii) MAC addresses of the IP (or IPX) instances, and (iii) VLAN identifiers of the VLAN on which the IP (or IPX) instances participate in RSMLT.

After the Hold-down timer has expired, MAC records associated with routing instances supported by the IST peer device are programmed by aggregation device (blocks 825, 830). Once a routing problem is detected, such as failure of a link to the IST peer device or failure of the IST peer device itself for example, the Hold-Up timer is activated (block 835 and 840). As a result, data traffic for the IST peer device is forwarded by the aggregation device until Hold-up timer expires. Also, one or more gratuitous ARP requests (IP) for all IP routing instances with RSMLT that are associated with the IST peer device are broadcast (block 840). Such broadcasting is performed by the IST peer device in response to a downed link or by the aggregation device in response to the downed IST peer device. Of course, for IPX routing protocol, an IPX-RIP packets (IPX) is triggered and are transmitted in lieu of ARP requests.

After the Hold-up timer has expired, the aggregation device discontinues operating as a "back up" switch for the IST peer device, and thus, does not provide providing alternative routing for the IST peer device (block 855).

Figure 9:
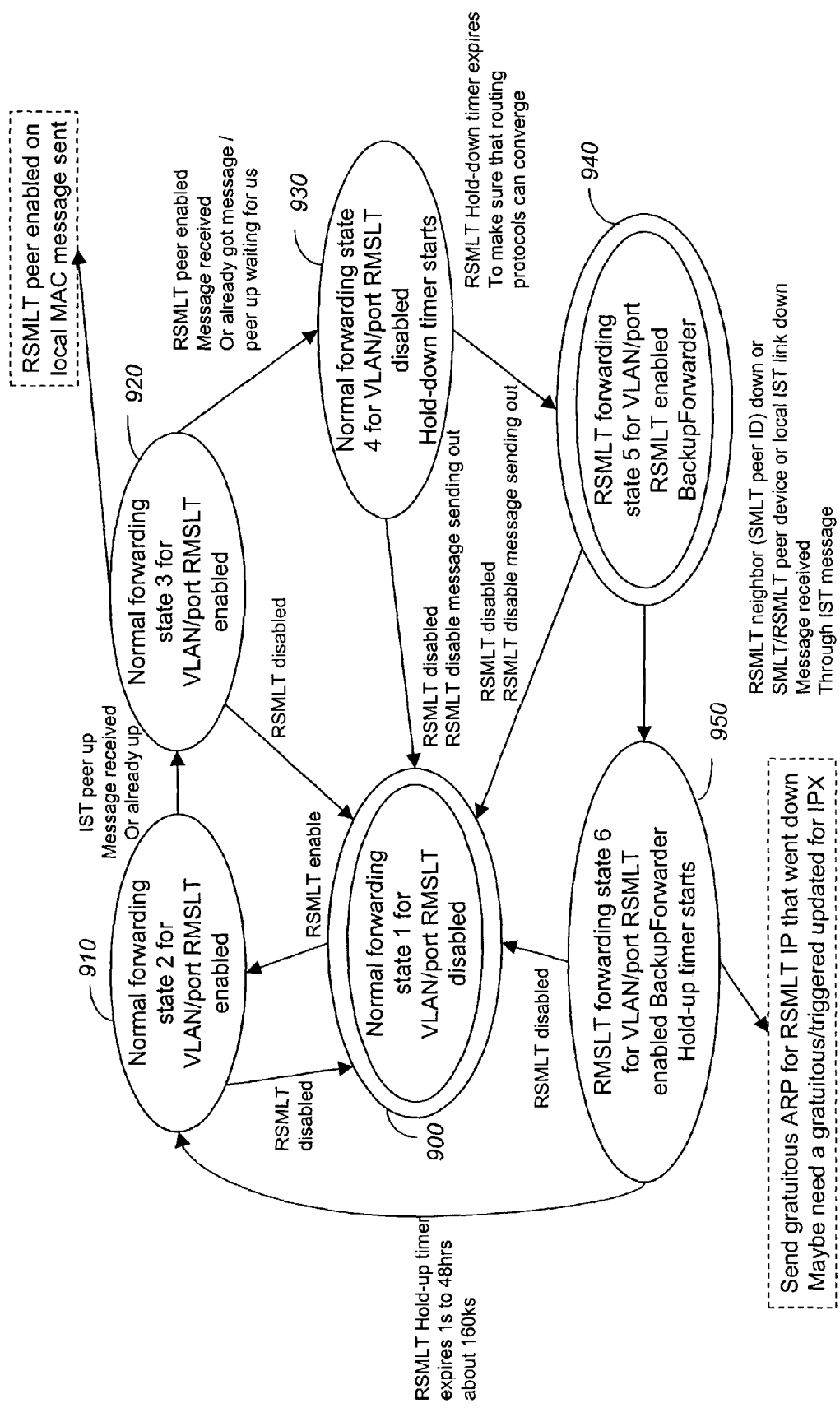
FIG. 9 is an exemplary state diagram of operations performed by one of the plurality of aggregation devices.

Referring to FIG. 9, an exemplary state diagram of operations performed by one of the plurality of aggregation devices of FIG. 4 is shown. The current operational state of the aggregation device is based on internal events as well as external events such as messages from another aggregation device such as a neighboring aggregation device or its IST peer device.

As shown, there are six RSMLT states of operation 900, 910, 920, 930, 940 and 950. During a first RSMLT state 900, RSMLT is disabled. This causes the aggregation device to perform normal data forwarding operations, namely, packets only addressed to the aggregation device are forwarded. Any of the other RSMLT states can return to first RSMLT state 900 once RSMLT is disabled.

If RSMLT is enabled, the aggregation device enters into a second RSMLT state 910. During this state, the aggregation device continues to perform normal data forwarding operations. However, in response to detecting that IST peer device is in operation or receiving a message that the IST peer device is in operation, the aggregation device enters into a third RSMLT state 920.

During third RSMLT state 920, the aggregation device sends a RSMLT Enable message to the IST peer device. The aggregation device enters into a fourth RSMLT state 930 upon receipt of a RSMLT Enable message from the IST peer device.

During fourth RSMLT state 930, the Hold-down timer of the aggregation device is activated to ensure that the routing protocol(s) can converge. From fourth RSMLT state 930, aggregation device can enter into first RSMLT state 900 if RSMLT is disabled at the aggregation device or a RSMLT Disable message is received from the IST peer device. Otherwise, when the Hold-down timer expires, the aggregation device enters into a fifth RSMLT state 940.

During fifth RSMLT state 940, the aggregation device performs RSMLT data forwarding. Namely, the aggregation device receives MAC addresses of routing instances supported by the IST peer device. As a result, the aggregation device is configured to handle packet forwarding for the IST peer device.

In the event that a neighboring aggregation device (identified by the SMLT peer ID), IST peer device or a local link goes down, detected by polling over the IST communication link, local IST link down or SMLT message, the aggregation device enters into a sixth RSMLT state 950. The Hold-Up timer for the aggregation device is activated to handle packet forwarding. For IP networks, an ARP request is directed to the IP address associated with the device or link that went down. For IPX networks that do not support ARP, IPX-RIP packets are used as described above and illustrated in FIGS. 6 and 7.

Once the Hold-Up timer expires, the aggregation device returns to second RSMLT state 910 for subsequent failover recovery as needed.

Figure 10:
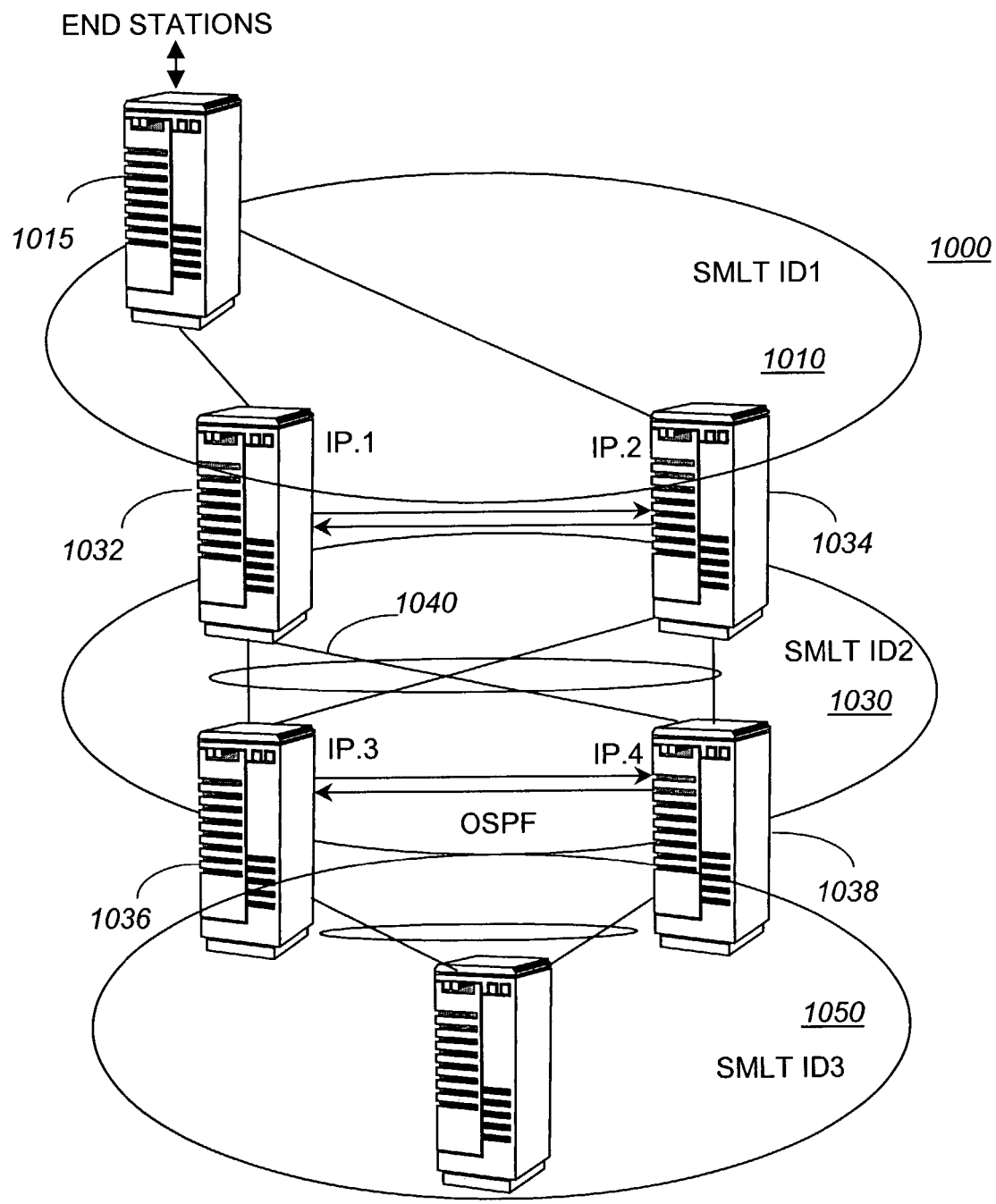
FIG. 10 is an exemplary embodiment of a network configured in accordance with RSMLT.

Referring now to FIG. 10, an exemplary embodiment of a network 1000 configured in accordance with RSMLT is shown. Network 1000 comprises multiple networks in communication with each other. A first network 1010 constitutes an access layer in which at least one edge device, namely a switch located at an edge of the network 1000 to which end stations are directly or indirectly (e.g., through hub or switch) coupled. Edge device 1015 is coupled to a pair of aggregation devices 1032 and 1034 via a split multilink trunk. The edge device 1015 may operate in accordance with RSMTL or SMTL with overlaying VRRP.

A second network 1030 constitutes an aggregation layer in which multiple aggregation devices are coupled together in accordance with a selected topology, such as a mesh topology for example. Each aggregation device 1032, 1034, 1036, 1038 is in communication with each other and is assigned a unique IP address. These IP addresses are denoted as IP.1, IP.2, IP.3, and IP.4 for this illustrative example. The routing protocol for this embodiment is OSPF, but other types of routing protocols may be used.

A third network 1050 constitutes a server layer in which one or more servers is in communication with aggregation devices 1036 and 1038 over a type of MLT link.

As shown, in response to a downed link between aggregation devices 1034 and 1038 for example, aggregation device 1034 broadcasts an ARP request for all IP routing instances with RSMLT supported by aggregation device 1034. Likewise, aggregation device 1038 broadcasts an ARP request for all IP routing instances with RSMLT supported by aggregation devices 1038. This would cause aggregation devices 1032, 1036, 1038 to alter their MAC records in order to provide an alternative routing path from aggregation device 1038. One possible routing path is from aggregation device 1038 to aggregation device 1032 over link 1040.

In response to a downed aggregation device 1034, the IST peer device of aggregation device 1034, namely aggregation device 1032, broadcasts an ARP request for all IP routing instances with RSMLT supported by device 1034. This would cause aggregation devices 1036 and 1038 to alter their MAC records to route data to aggregation device 1032 in lieu of aggregation device 1034.

It should be noted that the trunk splitting technique of the present invention is in no way limited to any particular type of communication device.

The present invention may be embodied in other specific forms without departing from the true scope of the invention. The described embodiments are to be considered in all respects only as illustrative and not restrictive.

While the invention has been described in terms of several embodiments, the invention should not limited to only those embodiments described, but can be practiced with modification and alteration within the spirit and scope of the invention.

What is claimed is:

1. A method comprising:

interconnecting at least two aggregation devices by an Inter Switch Trunk (IST) link to logically operate as a single device, the at least two aggregation devices operating concurrently; the at least two aggregation devices is routed split multilink trunking (RSMLT) enabled; and synchronizing forwarding records of local routing instances for Internet Protocol (IP) networking between the at least two aggregation devices, the forwarding records are media access control (MAC) records, each of the MAC records includes an indication that, when set to a first logic level, allows routing of that MAC record over a port different than ports through which the forwarding records are exchanged between the at least two aggregation devices over the IST link and, when the indication bit is set to a second logic level, does not allow routing of that MAC record over the IST trunk.

2. The method of claim 1 further comprising:

providing sub-second failover if one of the at least two aggregation devices fail and the at least two aggregation devices are operating as part of a Layer 3 (L3) network.

3. The method of claim 1, wherein the synchronizing of the MAC records includes exchanging local MAC addresses supported by a first aggregation device of the at least two aggregation devices with a second aggregation device of the at least two aggregation devices.

4. The method of claim 3, wherein each of the MAC records further comprise a routing bit that, when set, enables local routing instances of the first aggregation device to process packets having MAC addresses associated with the MAC records.

5. The method of claim 2 further comprising:

handling all packets received from and transferred to a communication device by a first aggregation device of the at least two aggregation devices when a second aggregation device of the at least two aggregation devices is down.

6. The method of claim 2 further comprising:

handling all information received from and transferred to a communication device by a first aggregation device of the at least two aggregation devices when a link interconnecting the communication device and a second aggregation device of the at least two aggregation devices is down.

7. A system comprising:

an Inter Switch Trunk (IST) link;

a first aggregation device coupled to the IST link, the first aggregation device comprises a first set of ports, first processing logic coupled to the first set of ports, and a first memory element coupled to the first processing logic, the first memory element including a routing table that comprises a first set of media access control (MAC) records, each MAC record of the first set of MAC records includes a routing bit that, when set to a first logical value, allows routing of that MAC record from the first set of ports over the IST link and when set to a second logical value, does not allow routing of that MAC record over the IST link; and a second aggregation device coupled to the IST link, the second aggregation device to obtain the first set of MAC records for use by one or more local routing instances for a Layer 3 (L3) networking protocol within the second aggregation device, wherein the first aggregation device and the second aggregation device are routed split multilink trunking (RSMLT) enabled.

8. The system of claim 7, wherein the second aggregation device comprises a second set of ports, second processing logic coupled to the second set of ports, and a second memory element coupled to the second processing logic, the second memory element including a table that comprises a second set of MAC records.

9. The system of claim 8, wherein the first aggregation device to obtain the second set of MAC records from the second aggregation device for use by one or more local routing instances within the first aggregation device.

10. The system of claim 7, wherein both the first aggregation device and the second aggregation device are switches.

11. The system of claim 7, wherein the first aggregation device informs the second aggregation device that it is routed split multilink trunking (RSMLT) enabled by issuing a first message to begin synchronization of the first and second sets of MAC records contained by the first and second aggregation devices.

12. The system of claim 11, wherein the first aggregation device sends a second message after the first message to begin synchronization of the MAC records, the second message comprises an IP address of IP routing instances of the first aggregation device, MAC addresses of the IP routing instances, and virtual local area network (VLAN) identifiers of a VLAN on which the IP routing instances participate.

13. The system of claim 11, wherein the first aggregation device sends a second message after the first message to begin synchronization of the MAC records, the message comprises an IPX network address of IPX routing instances of the first aggregation device, MAC addresses of the IPX routing instances, and virtual local area network (VLAN) identifiers of a VLAN on which the IPX routing instances participate.

14. The system of claim 12, wherein the second aggregation device comprises a hold-down timer that, upon receipt of the first and second messages, the hold-down timer is activated.

15. The system of claim 14, wherein after expiration of the hold-down timer of the second aggregation device, the first set of MAC records associated with local routing instances supported by the first aggregation device are programmed by the second aggregation device.

16. The system of claim 15, wherein the second aggregation device further comprises a hold-up timer that is activated once a routing problem is detected, at least some data traffic previously forwarded by the first aggregation device is then forwarded by the second aggregation device until the hold-up timer expires.

17. An aggregation device in communication with an Inter Switch Trunk (IST) peer device, comprising:

a control plane;

at least one port; and a data plane in communication with the control plane, the data plane to provide sub-second failover recovery and provide control plane protocols enough time to converge without adversely affecting data forwarding operations through synchronization of media access control (MAC) records of local routing instances for Internet Protocol (IP) networking with the IST peer device, each MAC record of the MAC records includes a routing bit that, when set to a first logical value, allows routing of that MAC record from the at least one port and when set to a second logical value, does not allow routing of that MAC record from the at least one port, wherein both the aggregation device and the IST peer device are routed split multilink trunking (RSMLT) enabled.

* * * * *